(12) United States Patent
Morris et al.

(10) Patent No.: US 9,303,667 B2
(45) Date of Patent: Apr. 5, 2016

(54) LOBULAR ELASTIC TUBE ALIGNMENT SYSTEM FOR PROVIDING PRECISE FOUR-WAY ALIGNMENT OF COMPONENTS

(71) Applicant: GM GLOBAL TECHNOLOGY OPERATIONS LLC, Detroit, MI (US)

(72) Inventors: Steven E. Morris, Fair Haven, MI (US); Jennifer P. Lawall, Waterford, MI (US)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 510 days.

(21) Appl. No.: 13/945,231

(22) Filed: Jul. 18, 2013

(65) Prior Publication Data
US 2015/0023724 A1    Jan. 22, 2015

(51) Int. Cl.
| F16B 5/12 | (2006.01) |
| F16B 24/00 | (2006.01) |
| B62D 27/00 | (2006.01) |
| F16B 5/00 | (2006.01) |
| F16B 5/06 | (2006.01) |
| F16B 19/00 | (2006.01) |

(52) U.S. Cl.
CPC . *F16B 5/12* (2013.01); *B62D 24/00* (2013.01); *B62D 27/00* (2013.01); *F16B 5/00* (2013.01); *F16B 5/0664* (2013.01); *F16B 19/002* (2013.01); *Y10T 403/1624* (2015.01)

(58) Field of Classification Search
CPC .... F16B 5/0032; F16B 5/0056; F16B 5/0657; F16B 5/126; F16B 21/08; F16B 21/086; F16B 21/088; B60R 13/04; B60R 13/0206; B60R 19/44; B60R 19/445; B62D 27/023; B62D 27/04

See application file for complete search history.

(56) References Cited

U.S. PATENT DOCUMENTS 1,219,398 A    3/1917    Huntsman
1,261,036 A    4/1918    Kerns
(Continued)

FOREIGN PATENT DOCUMENTS

| BE | 842302 A | 9/1976 |
| CN | 1036250 A | 10/1989 |

(Continued)

OTHER PUBLICATIONS

"Elastic Averaging in Flexture Mechanisms: A Multi-Beam Parelleaogram Flexture Case-Study" by Shorya Awtar and EDIP Sevincer, Proceedings of IDETC/CIE 2006, Paper DETC2006-99752, American Society of Mechanical Engineers (ASME), Sep. 2006.

(Continued)

*Primary Examiner* — Daniel Wiley
(74) *Attorney, Agent, or Firm* — Cantor Colburn LLP

(57) ABSTRACT

An elastically averaged alignment system includes a first component and a second component. The first component includes a first alignment member and an elastically deformable alignment element fixedly disposed with respect to the first alignment member. The second component includes a second alignment member and an alignment feature fixedly disposed with respect to the second alignment member. The elastically deformable alignment element is configured and disposed to interferingly, deformably and matingly engage the alignment feature. The elastically deformable alignment element includes a lobular hollow tube having a cross-section having at least three outwardly oriented lobes relative to a central axis of the hollow tube, and the alignment feature includes a circular aperture. Portions of the elastically deformable alignment element when inserted into the alignment feature elastically deform to an elastically averaged final configuration that aligns the first alignment member with the second alignment member in four planar orthogonal directions.

15 Claims, 5 Drawing Sheets

(56) References Cited

U.S. PATENT DOCUMENTS

| | | |
|---|---|---|
| 1,301,302 A | 4/1919 | Nolan |
| 1,556,233 A | 10/1925 | Maise |
| 1,819,126 A | 8/1931 | Scheibe |
| 1,929,848 A | 10/1933 | Neely |
| 1,968,168 A | 7/1934 | Place |
| 1,982,076 A | 11/1934 | Spahn |
| 2,006,525 A | 7/1935 | Thal |
| 2,267,558 A | 12/1941 | Birger et al. |
| 2,275,103 A | 3/1942 | Gooch et al. |
| 2,275,900 A | 3/1942 | Hall |
| 2,385,180 A | 9/1945 | Allen |
| 2,482,488 A | 9/1949 | Franc |
| 2,560,530 A | 7/1951 | Burdick |
| 2,612,139 A | 9/1952 | Collins |
| 2,688,894 A | 9/1954 | Modrey |
| 2,693,014 A | 11/1954 | Monahan |
| 2,707,607 A | 5/1955 | O'Connor |
| 2,778,399 A | 1/1957 | Mroz |
| 2,780,128 A | 2/1957 | Rapata |
| 2,862,040 A | 11/1958 | Curran |
| 2,902,902 A | 9/1959 | Slone |
| 2,946,612 A | 7/1960 | Ahlgren |
| 2,958,230 A | 11/1960 | Haroldson |
| 3,005,282 A | 10/1961 | Christiansen |
| 3,014,563 A | 12/1961 | Bratton |
| 3,087,352 A | 4/1963 | Daniel |
| 3,089,269 A | 5/1963 | McKiernan |
| 3,130,512 A | 4/1964 | Van Buren, Jr. |
| 3,152,376 A | 10/1964 | Boser |
| 3,168,961 A | 2/1965 | Yates |
| 3,169,004 A | 2/1965 | Rapata |
| 3,169,439 A | 2/1965 | Rapata |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,358 A | 2/1966 | Dehm |
| 3,233,503 A | 2/1966 | Birger |
| 3,244,057 A | 4/1966 | Mathison |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,551,963 A | 1/1971 | Long |
| 3,643,968 A | 2/1972 | Horvath |
| 3,680,272 A | 8/1972 | Meyer |
| 3,800,369 A | 4/1974 | Nikolits |
| 3,841,044 A | 10/1974 | Brown |
| 3,842,565 A | 10/1974 | Brown et al. |
| 3,845,961 A | 11/1974 | Byrd, III |
| 3,847,492 A | 11/1974 | Kennicutt et al. |
| 3,860,209 A | 1/1975 | Strecker |
| 3,895,408 A | 7/1975 | Leingang |
| 3,897,967 A | 8/1975 | Barenyl |
| 3,905,570 A | 9/1975 | Nieuwveld |
| 3,972,550 A | 8/1976 | Boughton |
| 3,988,808 A | 11/1976 | Poe et al. |
| 4,035,874 A | 7/1977 | Liljendahl |
| 4,039,215 A | 8/1977 | Minhinnick |
| 4,042,307 A | 8/1977 | Jarvis |
| 4,043,585 A | 8/1977 | Yamanaka |
| 4,158,511 A | 6/1979 | Herbenar |
| 4,169,297 A | 10/1979 | Weihrauch |
| 4,193,588 A | 3/1980 | Doneaux |
| 4,213,675 A | 7/1980 | Pilhall |
| 4,237,573 A | 12/1980 | Weihrauch |
| 4,300,851 A | 11/1981 | Thelander |
| 4,313,609 A | 2/1982 | Clements |
| 4,318,208 A | 3/1982 | Borja |
| 4,325,574 A | 4/1982 | Umemoto et al. |
| 4,363,839 A | 12/1982 | Watanabe et al. |
| 4,364,150 A | 12/1982 | Remington |
| 4,384,803 A | 5/1983 | Cachia |
| 4,394,853 A | 7/1983 | Lopez-Crevillen et al. |
| 4,406,033 A | 9/1983 | Chisholm et al. |
| 4,477,142 A | 10/1984 | Cooper |
| 4,481,160 A | 11/1984 | Bree |
| 4,527,760 A | 7/1985 | Salacuse |
| 4,575,060 A | 3/1986 | Kitagawa |
| 4,599,768 A | 7/1986 | Doyle |
| 4,605,575 A | 8/1986 | Auld et al. |
| 4,616,951 A | 10/1986 | Maatela |
| 4,648,649 A | 3/1987 | Beal |
| 4,654,760 A | 3/1987 | Matheson et al. |
| 4,745,656 A | 5/1988 | Revlett |
| 4,767,647 A | 8/1988 | Bree |
| 4,805,272 A | 2/1989 | Yamaguchi |
| 4,807,335 A | 2/1989 | Candea |
| 4,817,999 A | 4/1989 | Drew |
| 4,819,983 A | 4/1989 | Alexander et al. |
| 4,865,502 A | 9/1989 | Maresch |
| 4,881,764 A | 11/1989 | Takahashi et al. |
| 4,973,212 A | 11/1990 | Jacobs |
| 4,977,648 A | 12/1990 | Eckerud |
| 5,005,265 A | 4/1991 | Muller |
| 5,039,267 A | 8/1991 | Wollar |
| 5,139,285 A | 8/1992 | Lasinski |
| 5,154,479 A | 10/1992 | Sautter, Jr. |
| 5,165,749 A | 11/1992 | Sheppard |
| 5,170,985 A | 12/1992 | Killworth et al. |
| 5,180,219 A | 1/1993 | Geddie |
| 5,208,507 A | 5/1993 | Jung |
| 5,212,853 A | 5/1993 | Kaneko |
| 5,234,122 A | 8/1993 | Cherng |
| 5,297,322 A | 3/1994 | Kraus |
| 5,339,491 A | 8/1994 | Sims |
| 5,342,139 A | 8/1994 | Hoffman |
| 5,368,427 A | 11/1994 | Pfaffinger |
| 5,368,797 A | 11/1994 | Quentin et al. |
| 5,397,206 A | 3/1995 | Sihon |
| 5,407,310 A | 4/1995 | Kassouni |
| 5,446,965 A | 9/1995 | Makridis |
| 5,507,610 A | 4/1996 | Benedetti et al. |
| 5,513,603 A | 5/1996 | Ang et al. |
| 5,524,786 A | 6/1996 | Skudlarek |
| 5,538,079 A | 7/1996 | Pawlick |
| 5,556,808 A | 9/1996 | Williams et al. |
| 5,566,840 A | 10/1996 | Waldner |
| 5,575,601 A | 11/1996 | Skufca |
| 5,577,301 A | 11/1996 | DeMaagd |
| 5,577,779 A | 11/1996 | Dangel |
| 5,580,204 A | 12/1996 | Hultman |
| 5,586,372 A | 12/1996 | Eguchi et al. |
| 5,593,265 A | 1/1997 | Kizer |
| 5,601,453 A | 2/1997 | Horchler |
| 5,629,823 A | 5/1997 | Mizuta |
| 5,634,757 A | 6/1997 | Schanz |
| 5,657,516 A | 8/1997 | Berg et al. |
| 5,667,271 A | 9/1997 | Booth |
| 5,670,013 A | 9/1997 | Huang et al. |
| 5,698,276 A | 12/1997 | Mirabitur |
| 5,736,221 A | 4/1998 | Hardigg et al. |
| 5,765,942 A | 6/1998 | Shirai et al. |
| 5,775,860 A | 7/1998 | Meyer |
| 5,795,118 A | 8/1998 | Osada et al. |
| 5,797,170 A | 8/1998 | Akeno |
| 5,797,714 A | 8/1998 | Oddenino |
| 5,803,646 A | 9/1998 | Weihrauch |
| 5,806,915 A | 9/1998 | Takabatake |
| 5,810,535 A | 9/1998 | Fleckenstein et al. |
| 5,820,292 A | 10/1998 | Fremstad |
| 5,846,631 A | 12/1998 | Nowosiadly |
| 5,934,729 A | 8/1999 | Baack |
| 5,941,673 A | 8/1999 | Hayakawa et al. |
| 6,073,315 A | 6/2000 | Rasmussen |
| 6,079,083 A | 6/2000 | Akashi |
| 6,095,594 A | 8/2000 | Riddle et al. |
| 6,103,987 A | 8/2000 | Nordquist |
| 6,109,882 A | 8/2000 | Popov |
| 6,152,436 A | 11/2000 | Sonderegger et al. |
| 6,164,603 A | 12/2000 | Kawai |
| 6,193,430 B1 | 2/2001 | Culpepper et al. |

(56) References Cited

U.S. PATENT DOCUMENTS

| | | |
|---|---|---|
| 6,199,248 B1 | 3/2001 | Akashi |
| 6,202,962 B1 | 3/2001 | Snyder |
| 6,209,175 B1 | 4/2001 | Gershenson |
| 6,209,178 B1 | 4/2001 | Wiese et al. |
| 6,254,304 B1 | 7/2001 | Takizawa et al. |
| 6,264,869 B1 | 7/2001 | Notarpietro et al. |
| 6,299,478 B1 | 10/2001 | Jones et al. |
| 6,321,495 B1 | 11/2001 | Oami |
| 6,336,767 B1 | 1/2002 | Nordquist et al. |
| 6,345,420 B1 | 2/2002 | Nabeshima |
| 6,349,904 B1 | 2/2002 | Polad |
| 6,351,380 B1 | 2/2002 | Curlee |
| 6,354,815 B1 | 3/2002 | Svihla et al. |
| 6,378,931 B1 | 4/2002 | Kolluri et al. |
| 6,398,449 B1 | 6/2002 | Loh |
| 6,484,370 B2 | 11/2002 | Kanie et al. |
| 6,485,241 B1 | 11/2002 | Oxford |
| 6,523,229 B2 | 2/2003 | Severson |
| 6,523,817 B1 | 2/2003 | Landry, Jr. |
| 6,533,391 B1 | 3/2003 | Pan |
| 6,543,979 B2 | 4/2003 | Iwatsuki |
| 6,557,260 B1 | 5/2003 | Morris |
| 6,568,701 B1 | 5/2003 | Burdack et al. |
| 6,579,397 B1 | 6/2003 | Spain et al. |
| 6,591,801 B1 | 7/2003 | Fonville |
| 6,609,717 B2 | 8/2003 | Hinson |
| 6,637,095 B2 | 10/2003 | Stumpf et al. |
| 6,658,698 B2 | 12/2003 | Chen |
| 6,662,411 B2 | 12/2003 | Rubenstein |
| 6,664,470 B2 | 12/2003 | Nagamoto |
| 6,677,065 B2 | 1/2004 | Blauer |
| 6,692,016 B2 | 2/2004 | Yokota |
| 6,712,329 B2 | 3/2004 | Ishigami et al. |
| 6,746,172 B2 | 6/2004 | Culpepper |
| 6,757,942 B2 | 7/2004 | Matsui |
| 6,799,758 B2 | 10/2004 | Fries |
| 6,821,091 B2 | 11/2004 | Lee |
| 6,840,969 B2 | 1/2005 | Kobayashi et al. |
| 6,857,676 B2 | 2/2005 | Kawaguchi et al. |
| 6,857,809 B2 | 2/2005 | Granata |
| 6,908,117 B1 | 6/2005 | Pickett, Jr. et al. |
| 6,932,416 B2 | 8/2005 | Clauson |
| 6,948,753 B2 | 9/2005 | Yoshida et al. |
| 6,951,349 B2 | 10/2005 | Yokota |
| 6,959,954 B2 | 11/2005 | Brandt et al. |
| 6,966,601 B2 | 11/2005 | Matsumoto et al. |
| 6,971,831 B2 | 12/2005 | Fattori et al. |
| 6,997,487 B2 | 2/2006 | Kitzis |
| 7,000,941 B2 | 2/2006 | Yokota |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,055,785 B1 | 6/2006 | Diggle, III |
| 7,055,849 B2 | 6/2006 | Yokota |
| 7,059,628 B2 | 6/2006 | Yokota |
| 7,073,260 B2 | 7/2006 | Jensen |
| 7,089,998 B2 | 8/2006 | Crook |
| 7,097,198 B2 | 8/2006 | Yokota |
| 7,121,611 B2 | 10/2006 | Hirotani et al. |
| 7,144,183 B2 | 12/2006 | Lian et al. |
| 7,172,210 B2 | 2/2007 | Yokota |
| 7,178,855 B2 | 2/2007 | Catron et al. |
| 7,198,315 B2 | 4/2007 | Cass et al. |
| 7,234,852 B2 | 6/2007 | Nishizawa et al. |
| 7,306,418 B2 | 12/2007 | Kornblum |
| 7,322,500 B2 | 1/2008 | Maierholzner |
| 7,344,056 B2 | 3/2008 | Shelmon et al. |
| 7,360,964 B2 | 4/2008 | Tsuya |
| 7,369,408 B2 | 5/2008 | Chang |
| 7,435,031 B2 | 10/2008 | Granata |
| 7,454,105 B2 | 11/2008 | Yi |
| 7,487,884 B2 | 2/2009 | Kim |
| 7,493,716 B2 | 2/2009 | Brown |
| 7,547,061 B2 | 6/2009 | Horimatsu |
| 7,557,051 B2 | 7/2009 | Ryu et al. |
| 7,568,316 B2 | 8/2009 | Choby et al. |
| 7,591,573 B2 | 9/2009 | Maliar et al. |
| D602,349 S | 10/2009 | Andersson |
| 7,614,836 B2 | 11/2009 | Mohiuddin |
| 7,672,126 B2 | 3/2010 | Yeh |
| 7,677,650 B2 | 3/2010 | Huttenlocher |
| 7,727,667 B2 | 6/2010 | Sakurai |
| 7,764,853 B2 | 7/2010 | Yi et al. |
| 7,793,998 B2 | 9/2010 | Matsui et al. |
| 7,802,831 B2 | 9/2010 | Isayama et al. |
| 7,828,372 B2 | 11/2010 | Ellison |
| 7,862,272 B2 | 1/2011 | Nakajima |
| 7,869,003 B2 | 1/2011 | Van Doren et al. |
| 7,883,137 B2 | 2/2011 | Bar |
| 7,922,415 B2 | 4/2011 | Rudduck et al. |
| 7,946,684 B2 | 5/2011 | Drury et al. |
| 8,029,222 B2 | 10/2011 | Nitsche |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,203,496 B2 | 6/2012 | Miller et al. |
| 8,203,843 B2 | 6/2012 | Chen |
| 8,228,640 B2 | 7/2012 | Woodhead et al. |
| 8,249,679 B2 | 8/2012 | Cui |
| 8,261,581 B2 | 9/2012 | Cerruti et al. |
| 8,276,961 B2 | 10/2012 | Kwolek |
| 8,291,553 B2 | 10/2012 | Moberg |
| 8,297,137 B2 | 10/2012 | Dole |
| 8,297,661 B2 | 10/2012 | Proulx et al. |
| 8,312,887 B2 | 11/2012 | Dunn et al. |
| 8,371,788 B2 | 2/2013 | Lange |
| 8,414,048 B1 | 4/2013 | Kwolek |
| 8,444,199 B2 | 5/2013 | Takeuchi et al. |
| 8,572,818 B2 | 11/2013 | Hofmann |
| 8,619,504 B2 | 12/2013 | Wyssbrod |
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,746,801 B2 | 6/2014 | Nakata |
| 8,826,499 B2 | 9/2014 | Tempesta |
| 8,833,771 B2 | 9/2014 | Lesnau |
| 8,833,832 B2 | 9/2014 | Whipps |
| 8,834,058 B2 | 9/2014 | Woicke |
| 8,905,812 B2 | 12/2014 | Pai-Chen |
| 8,910,350 B2 | 12/2014 | Poulakis |
| 9,003,891 B2 | 4/2015 | Frank |
| 9,039,318 B2 | 5/2015 | Mantei et al. |
| 9,050,690 B2 | 6/2015 | Hammer et al. |
| 9,061,715 B2 | 6/2015 | Morris |
| 9,062,991 B2 | 6/2015 | Kanagaraj |
| 9,067,625 B2 | 6/2015 | Morris |
| 2001/0030414 A1 | 10/2001 | Yokota |
| 2001/0045757 A1 | 11/2001 | Hideki et al. |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0136617 A1 | 9/2002 | Imahigashi |
| 2003/0007831 A1 | 1/2003 | Lian et al. |
| 2003/0059255 A1 | 3/2003 | Kirchen |
| 2003/0080131 A1 | 5/2003 | Fukuo |
| 2003/0082986 A1 | 5/2003 | Wiens et al. |
| 2003/0087047 A1 | 5/2003 | Blauer |
| 2003/0108401 A1 | 6/2003 | Agha et al. |
| 2003/0180122 A1 | 9/2003 | Dobson |
| 2004/0028503 A1 | 2/2004 | Charles |
| 2004/0037637 A1 | 2/2004 | Lian et al. |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2004/0262873 A1 | 12/2004 | Wolf et al. |
| 2005/0016116 A1 | 1/2005 | Scherff |
| 2005/0031946 A1 | 2/2005 | Kruger et al. |
| 2005/0054229 A1 | 3/2005 | Tsuya |
| 2005/0082449 A1 | 4/2005 | Kawaguchi et al. |
| 2005/0109489 A1 | 5/2005 | Kobayashi |

(56) References Cited

U.S. PATENT DOCUMENTS

| | | |
|---|---|---|
| 2005/0156409 A1 | 7/2005 | Yokota |
| 2005/0156410 A1 | 7/2005 | Yokota |
| 2005/0156416 A1 | 7/2005 | Yokota |
| 2005/0244250 A1 | 11/2005 | Okada et al. |
| 2006/0092653 A1 | 5/2006 | Tachiiwa et al. |
| 2006/0102214 A1 | 5/2006 | Clemons |
| 2006/0110109 A1 | 5/2006 | Yi et al. |
| 2006/0113755 A1 | 6/2006 | Yokota |
| 2006/0125286 A1 | 6/2006 | Horimatsu et al. |
| 2006/0141318 A1 | 6/2006 | MacKinnon et al. |
| 2006/0163902 A1 | 7/2006 | Engel |
| 2006/0170242 A1 | 8/2006 | Forrester et al. |
| 2006/0197356 A1 | 9/2006 | Catron et al. |
| 2006/0202449 A1 | 9/2006 | Yokota |
| 2006/0237995 A1 | 10/2006 | Huttenlocher |
| 2006/0249520 A1 | 11/2006 | DeMonte |
| 2006/0264076 A1 | 11/2006 | Chen |
| 2007/0034636 A1 | 2/2007 | Fukuo |
| 2007/0040411 A1 | 2/2007 | Dauvergne |
| 2007/0113483 A1 | 5/2007 | Hernandez |
| 2007/0113485 A1 | 5/2007 | Hernandez |
| 2007/0126211 A1 | 6/2007 | Moerke et al. |
| 2007/0137018 A1 | 6/2007 | Aigner et al. |
| 2007/0144659 A1 | 6/2007 | De La Fuente |
| 2007/0205627 A1 | 9/2007 | Ishiguro |
| 2007/0227942 A1 | 10/2007 | Hirano |
| 2007/0251055 A1 | 11/2007 | Gerner |
| 2007/0274777 A1 | 11/2007 | Winkler |
| 2007/0292205 A1 | 12/2007 | Duval |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0217796 A1 | 9/2008 | Van Bruggen et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0093111 A1 | 4/2009 | Buchwalter et al. |
| 2009/0126168 A1 | 5/2009 | Kobe et al. |
| 2009/0134652 A1 | 5/2009 | Araki |
| 2009/0141449 A1 | 6/2009 | Yeh |
| 2009/0174207 A1 | 7/2009 | Lota |
| 2009/0243172 A1 | 10/2009 | Ting et al. |
| 2009/0265896 A1 | 10/2009 | Beak |
| 2009/0309388 A1 | 12/2009 | Ellison |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton et al. |
| 2010/0134128 A1 | 6/2010 | Hobbs |
| 2010/0147355 A1 | 6/2010 | Shimizu et al. |
| 2010/0232171 A1 | 9/2010 | Cannon |
| 2010/0247034 A1 | 9/2010 | Yi et al. |
| 2010/0263417 A1 | 10/2010 | Shoenow |
| 2010/0270745 A1 | 10/2010 | Hurlbert et al. |
| 2010/0307848 A1 | 12/2010 | Hashimoto |
| 2011/0012378 A1 | 1/2011 | Ueno et al. |
| 2011/0036542 A1 | 2/2011 | Woicke |
| 2011/0076588 A1 | 3/2011 | Yamaura |
| 2011/0083392 A1 | 4/2011 | Timko |
| 2011/0103884 A1 | 5/2011 | Shiomoto et al. |
| 2011/0119875 A1 | 5/2011 | Iwasaki |
| 2011/0131918 A1 | 6/2011 | Glynn |
| 2011/0154645 A1 | 6/2011 | Morgan |
| 2011/0175376 A1 | 7/2011 | Whitens et al. |
| 2011/0183152 A1 | 7/2011 | Lanham |
| 2011/0191990 A1 | 8/2011 | Beaulieu |
| 2011/0207024 A1 | 8/2011 | Bogumil et al. |
| 2011/0239418 A1 | 10/2011 | Huang |
| 2011/0296764 A1 | 12/2011 | Sawatani et al. |
| 2011/0311332 A1 | 12/2011 | Ishman |
| 2012/0000291 A1 | 1/2012 | Christoph |
| 2012/0020726 A1 | 1/2012 | Jan |
| 2012/0073094 A1 | 3/2012 | Bishop |
| 2012/0112489 A1 | 5/2012 | Okimoto |
| 2012/0115010 A1 | 5/2012 | Smith et al. |
| 2012/0240363 A1 | 9/2012 | Lee |
| 2012/0251226 A1 | 10/2012 | Liu et al. |
| 2012/0261951 A1 | 10/2012 | Mildner et al. |
| 2012/0301067 A1 | 11/2012 | Morgan |
| 2012/0311829 A1 | 12/2012 | Dickinson |
| 2012/0321379 A1 | 12/2012 | Wang et al. |
| 2013/0019454 A1 | 1/2013 | Colombo et al. |
| 2013/0019455 A1 | 1/2013 | Morris |
| 2013/0027852 A1 | 1/2013 | Wang |
| 2013/0055822 A1 | 3/2013 | Frank |
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1 | 2/2014 | Morris et al. |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |
| 2014/0132023 A1 | 5/2014 | Watanabe |
| 2014/0175774 A1 | 6/2014 | Kansteiner |
| 2014/0202628 A1 | 7/2014 | Sreetharan et al. |
| 2014/0208561 A1 | 7/2014 | Colombo et al. |
| 2014/0208572 A1 | 7/2014 | Colombo et al. |
| 2014/0264206 A1 | 9/2014 | Morris |
| 2014/0292013 A1 | 10/2014 | Colombo et al. |
| 2014/0298638 A1 | 10/2014 | Colombo et al. |
| 2014/0298640 A1 | 10/2014 | Morris et al. |
| 2014/0298962 A1 | 10/2014 | Morris et al. |
| 2014/0300130 A1 | 10/2014 | Morris et al. |
| 2014/0301103 A1 | 10/2014 | Colombo et al. |
| 2014/0301777 A1 | 10/2014 | Morris et al. |
| 2014/0301778 A1 | 10/2014 | Morris et al. |
| 2014/0360824 A1 | 12/2014 | Morris et al. |
| 2014/0360826 A1 | 12/2014 | Morris et al. |
| 2014/0366326 A1 | 12/2014 | Colombo et al. |
| 2014/0369742 A1 | 12/2014 | Morris et al. |
| 2014/0369743 A1 | 12/2014 | Morris et al. |
| 2015/0016864 A1 | 1/2015 | Morris et al. |
| 2015/0016918 A1 | 1/2015 | Colombo |
| 2015/0069779 A1 | 3/2015 | Morris et al. |
| 2015/0274217 A1 | 10/2015 | Colombo |
| 2015/0291222 A1 | 10/2015 | Colombo et al. |

FOREIGN PATENT DOCUMENTS

| | | |
|---|---|---|
| CN | 1205285 A | 1/1999 |
| CN | 1328521 A | 12/2001 |
| CN | 1426872 A | 7/2003 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |
| CN | 1933747 A | 3/2007 |
| CN | 2888807 Y | 4/2007 |
| CN | 1961157 A | 5/2007 |
| CN | 2915389 | 6/2007 |
| CN | 101250964 A | 4/2008 |
| CN | 201259846 Y | 6/2009 |
| CN | 201268336 Y | 7/2009 |
| CN | 201310827 Y | 9/2009 |
| CN | 201540513 U | 8/2010 |
| CN | 101821534 | 9/2010 |
| CN | 101930253 A | 12/2010 |
| CN | 201703439 U | 1/2011 |
| CN | 201737062 U | 2/2011 |
| CN | 201792722 U | 4/2011 |
| CN | 201818606 U | 5/2011 |
| CN | 201890285 U | 7/2011 |
| CN | 102144102 A | 8/2011 |
| CN | 102235402 A | 11/2011 |

(56) References Cited

FOREIGN PATENT DOCUMENTS

| | | |
|---|---|---|
| CN | 202079532 U | 12/2011 |
| CN | 102313952 A | 1/2012 |
| CN | 202132326 U | 2/2012 |
| CN | 102756633 | 10/2012 |
| CN | 102803753 A | 11/2012 |
| CN | 102869891 A | 1/2013 |
| CN | 202686206 U | 1/2013 |
| CN | 102939022 A | 2/2013 |
| CN | 202987018 U | 6/2013 |
| CN | 103201525 A | 7/2013 |
| DE | 1220673 B | 7/1966 |
| DE | 3704190 A1 | 12/1987 |
| DE | 3711696 A1 | 10/1988 |
| DE | 3805693 A1 | 2/1989 |
| DE | 69600357 T2 | 12/1998 |
| DE | 10234253 B3 | 4/2004 |
| DE | 102008005618 A1 | 7/2009 |
| DE | 102008047464 A1 | 4/2010 |
| DE | 102010028323 A1 | 11/2011 |
| DE | 102011050003 A1 | 10/2012 |
| DE | 102012212101 B3 | 7/2013 |
| EP | 0118796 | 9/1984 |
| EP | 1132263 A1 | 9/2001 |
| EP | 1243471 A2 | 9/2002 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 1452745 A1 | 9/2004 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| JP | 2000010514 A | 1/2000 |
| JP | 2001141154 A | 5/2001 |
| JP | 2001171554 A | 6/2001 |
| JP | 2005268004 | 9/2005 |
| JP | 2006205918 | 8/2006 |
| JP | 2008307938 A | 12/2008 |
| JP | 2009084844 | 4/2009 |
| JP | 2009187789 A | 8/2009 |
| JP | 2011085174 A | 4/2011 |
| JP | 2012060791 A | 3/2012 |
| JP | 2012112533 A | 6/2012 |
| KR | 20030000251 A1 | 1/2003 |
| WO | 0055517 A2 | 3/2000 |
| WO | 0132454 A3 | 11/2001 |
| WO | 2004010011 | 1/2004 |
| WO | 2008140659 A1 | 11/2008 |
| WO | 2010105354 A1 | 9/2010 |
| WO | 2011025606 | 3/2011 |
| WO | 2013088447 A1 | 6/2013 |
| WO | 2013191622 A1 | 12/2013 |

OTHER PUBLICATIONS

"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.
"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.
"Passive Alignment of Micro-Fluidic Chips Using the Principle of Elastic Averaging" by Sitanshu Gurung, Thesis, Louisiana State University, Dept. of Mechanical Engineering, Dec. 2007.
"Precision Connector Assembly Using Elastic Averaging" by Patrick J. Willoughby and Alexander H. Slocum, Massachusetts Institute of Technology (MIT), Cambridge, MA, American Society for Precision Engineering, 2004.
U.S. Appl. No. 13/752,449, filed Jan. 29, 2013, entitled "Elastic Insert Alignment Assembly and Method of Reducing Positional Variation", inventors: Steven E. Morris and Michael D. Richardson.
U.S. Appl. No. 13/755,759, filed Jan. 31, 2013, entitled "Elastic Alignment Assembly for Aligning Mated Components and Method of Reducing Positional Variation", inventors: Joel Colombo, Michael D. Richardson, and Steven E. Morris.
U.S. Appl. No. 13/851,222, filed Mar. 27, 2013, entitled "Elastically Averaged Alignment System", inventors: Joel Colombo and Steven E. Morris.
U.S. Appl. No. 13/855,928, filed Apr. 3, 2013, entitled "Elastic Averaging Alignment System, Method of Making the Same and Cutting Punch Therefor", inventors: Steven E. Morris, Jennifer P. Lawall, Joel Colombo, and Jeffrey L. Konchan.
U.S. Appl. No. 13/856,888, filed Apr. 4, 2013, entitled "Elastic Retaining Assembly for Matable Components and Method of Assembling", inventors: Steven E. Morris, Jennifer P. Lawall, Joel Colombo, and Toure D. Lee.
U.S. Appl. No. 13/856,927, filed Apr. 4, 2013, entitled "Elastic Tubular Attachment Assembly for Mating Components and Method of Mating Components", inventors: Steven E. Morris and Jennifer P. Lawall.
U.S. Appl. No. 13/856,956, filed Apr. 4, 2013, entitled "Elastic Clip Retaining Arrangement and Method of Mating Structures with an Elastic Clip Retaining Arrangement", inventors: Joel Colombo, Steven E. Morris and Jeffrey L. Konchan.
U.S. Appl. No. 13/856,973, filed Apr. 4, 2013, entitled "Elastically Deformable Flange Locator Arrangement and Method of Reducing Positional Variation", inventors: Joel Colombo, Steven E. Morris and Michael D. Richardson.
U.S. Appl. No. 13/858,478, filed Apr. 8, 2013, entitled "Elastic Mating Assembly and Method of Elastically Assembling Matable Components", inventors: Steven E. Morris and Jennifer P. Lawall.
U.S. Appl. No. 13/859,109, filed Apr. 9, 2013, entitled "Elastic Retaining Arrangement for Jointed Components and Method of Reducing a Gap Between Jointed Components," inventors: Steven E. Morris, James M. Kushner, Victoria L. Enyedy, Jennifer P. Lawall, and Piotr J. Ogonek.
U.S. Appl. No. 13/915,132, filed Jun. 11, 2013, entitled "Elastically Deformable Energy Management Arrangement and Method of Managing Energy Absorption," inventors: Steven E. Morris, Randy A. Johnson and Jennifer P. Lawall.
U.S. Appl. No. 13/915,177, filed Jun. 11, 2013, entitled "Elastically Deformable Energy Management Assembly and Method of Managing Energy Absorption," inventors: Steven E. Morris, Jennifer P. Lawall, and Randy Johnson.
U.S. Appl. No. 13/917,005, filed Jun. 13, 2013, entitled "Elastic Attachment Assembly and Method of Reducing Positional Variation and Increasing Stiffness," inventors: Steven E Morris and Jennifer P. Lawall.
U.S. Appl. No. 13/917,074, filed Jun. 13, 2013, entitled "Elastically Deformable Retaining Hook for Components to be Mated Together and Method of Assembling", inventors: Joel Colombo, Jeffrey L. Konchan, Steven E. Morris, and Steve J. Briggs.
U.S. Appl. No. 13/918,183, filed Jun. 14, 2013, entitled "Elastic Retaining Assembly for Matable Components and Method of Assembling," inventors: Steven E. Morris and Jennifer P. Lawall.
U.S. Appl. No. 13/939,503, filed on Jul. 11, 2013, entitled "Elastically Averaged Alignment Systems and Methods," inventor: Joel Colombo.
U.S. Appl. No. 13/940,912, filed Jul. 12, 2013, entitled "Alignment Arrangement for Mated Components and Method", inventors: Steven E. Morris and Jennifer P. Lawall.
Cross-sectional view of a prior art infrared welded assembly of BMW, Munich, Germany. Believed on the market since about Jan. 1, 2010.
"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

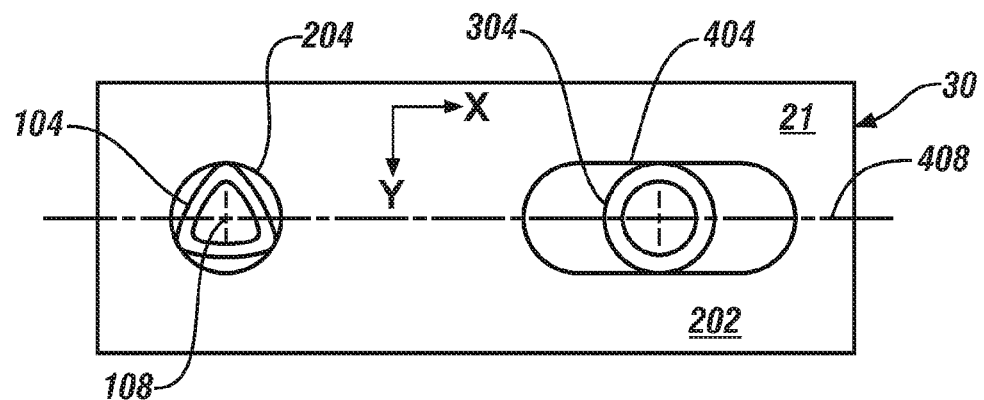
FIG. 7
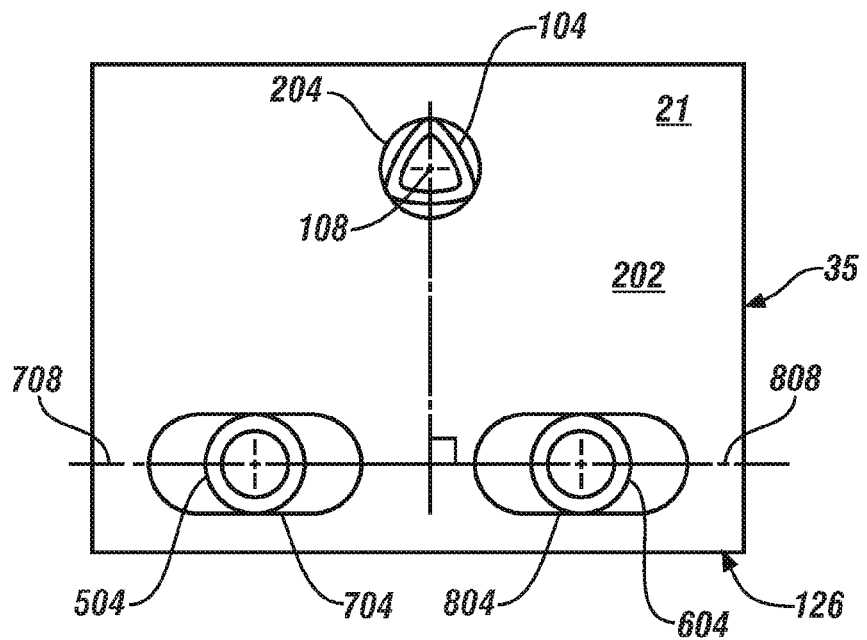
FIG. 8
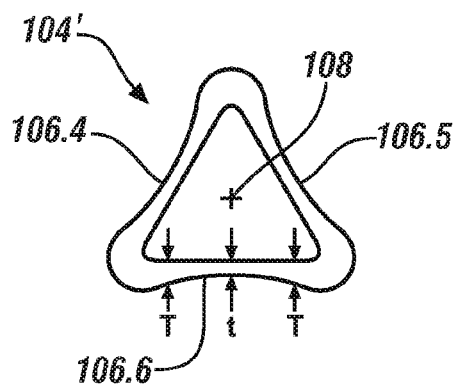 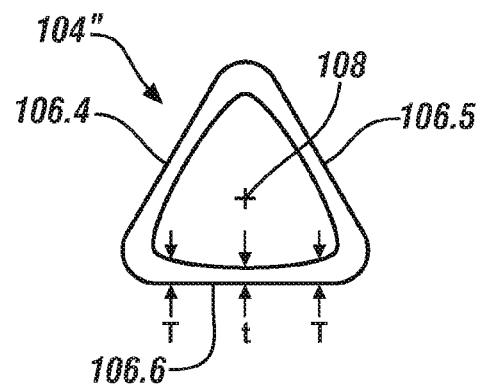
FIG. 9   FIG. 10

LOBULAR ELASTIC TUBE ALIGNMENT SYSTEM FOR PROVIDING PRECISE FOUR-WAY ALIGNMENT OF COMPONENTS

FIELD OF THE INVENTION

The subject invention relates to the art of alignment systems, more particularly to an elastically averaged alignment system, and even more particularly to an elastically averaged alignment system providing four-way alignment of mating components on which the alignment system is incorporated.

BACKGROUND

Currently, components, particularly vehicular components such as those found in automotive vehicles, which are to be mated together in a manufacturing process are mutually located with respect to each other by alignment features that are oversized and/or undersized to provide spacing to freely move the components relative to one another to align them without creating an interference therebetween that would hinder the manufacturing process. One example includes two-way and/or four-way male alignment features, typically upstanding bosses, which are received into corresponding female alignment features, typically apertures in the form of holes or slots. There is a clearance between the male alignment features and their respective female alignment features which is predetermined to match anticipated size and positional variation tolerances of the male and female alignment features as a result of manufacturing (or fabrication) variances. As a result, significant positional variation can occur between the mated first and second components having the aforementioned alignment features, which may contribute to the presence of undesirably large variation in their alignment, particularly with regard to the gaps and spacing between them. In the case where these misaligned components are also part of another assembly, such misalignments can also affect the function and/or aesthetic appearance of the entire assembly. Regardless of whether such misalignment is limited to two components or an entire assembly, it can negatively affect function and result in a perception of poor quality.

Accordingly, the art of alignment systems can be enhanced by providing a precise or fine positioning and alignment system or mechanism that can ensure precise four-way alignment of two components via elastic averaging of a single elastically deformable alignment element disposed in mating engagement with a corresponding single alignment feature.

SUMMARY OF THE INVENTION

An exemplary embodiment of the invention includes an elastically averaged alignment system having a first component and a second component. The first component includes a first alignment member and an elastically deformable alignment element fixedly disposed with respect to the first alignment member. The second component includes a second alignment member and an alignment feature fixedly disposed with respect to the second alignment member. The elastically deformable alignment element is configured and disposed to interferingly, deformably and matingly engage the alignment feature. The elastically deformable alignment element includes a lobular hollow tube having a cross-section having at least three outwardly oriented lobes relative to a central axis of the hollow tube, and the alignment feature includes a circular aperture. Portions of the elastically deformable alignment element when inserted into the alignment feature elastically deform to an elastically averaged final configuration that aligns the first alignment member with the second alignment member in four planar orthogonal directions.

Another exemplary embodiment of the invention includes a vehicle having a body and an elastically averaged alignment system integrally arranged with the body. The elastically averaged alignment system includes a first component and a second component. The first component includes a first alignment member and an elastically deformable alignment element fixedly disposed with respect to the first alignment member. The second component includes a second alignment member and an alignment feature fixedly disposed with respect to the second alignment member. The elastically deformable alignment element is configured and disposed to interferingly, deformably and matingly engage the alignment feature. The elastically deformable alignment element includes a lobular hollow tube having a cross-section having at least three outwardly oriented lobes relative to a central axis of the hollow tube, and the alignment feature includes a circular aperture. Portions of the elastically deformable alignment element when inserted into the alignment feature elastically deform to an elastically averaged final configuration that aligns the first alignment member with the second alignment member in four planar orthogonal directions.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 7 depicts a rear plan view of another elastically averaging alignment system having additional elastically averaging features that are combinable with the elastically averaging features depicted in FIG. 1, in accordance with an embodiment of the invention;

FIG. 8 depicts a rear plan view of yet another elastically averaging alignment system having additional elastically averaging features that are combinable with the elastically averaging features depicted in FIG. 1, in accordance with an embodiment of the invention;

FIG. 9 depicts a front plan view of a tri-lobular elastically deformable alignment element in accordance with an embodiment of the invention;

FIG. 10 depicts a front plan view of another tri-lobular elastically deformable alignment element in accordance with an embodiment of the invention;

DESCRIPTION OF THE EMBODIMENTS

Figure 1:
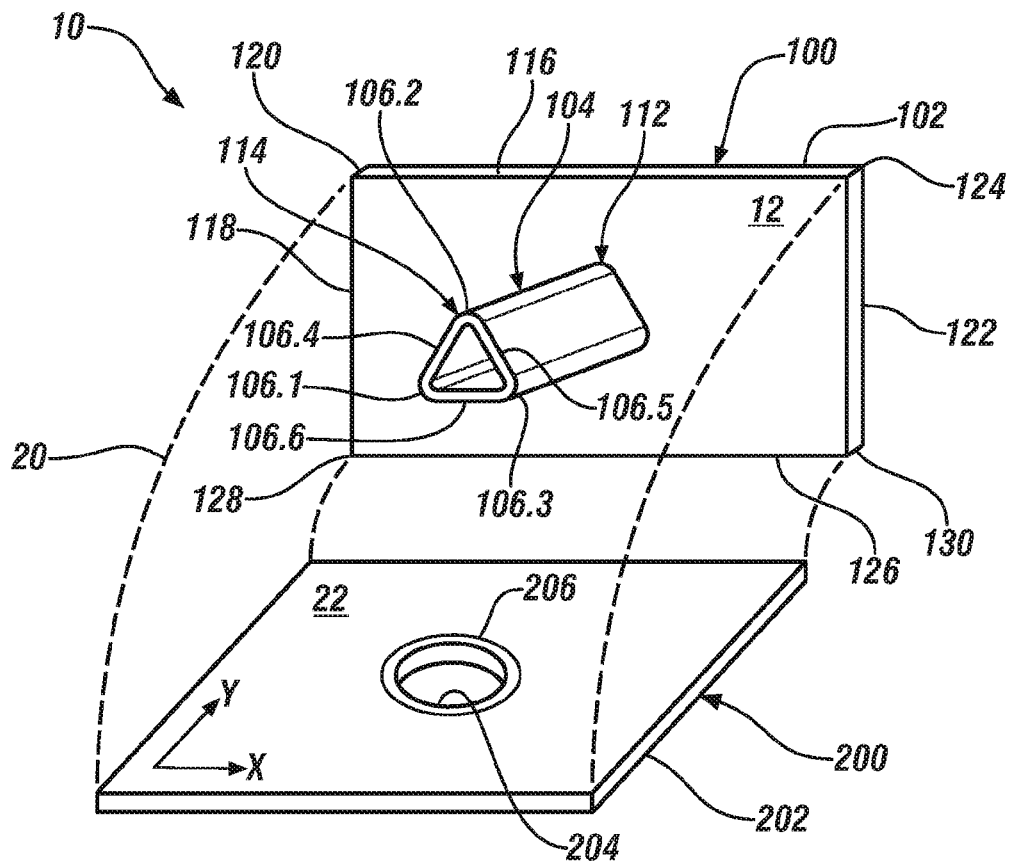
FIG. 1 depicts an elastically averaging alignment system in accordance with an embodiment of the invention.

The following description is merely exemplary in nature and is not intended to limit the present disclosure, its application or uses. For example, the embodiments shown are applicable to vehicle body panels, but the alignment system disclosed herein may be used with any suitable components to provide elastic averaging for precision location and alignment of all manner of mating components and component applications, including many industrial, consumer product (e.g., consumer electronics, various appliances and the like), transportation, energy and aerospace applications, and particularly including many other types of vehicular components and applications, such as various interior, exterior and under hood vehicular components and applications. It should be understood that throughout the drawings, corresponding reference numerals indicate like or corresponding parts and features.

As used herein, the term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187,675, the disclosure of which is incorporated by reference herein in its entirety. The embodiments disclosed above provide the ability to convert an existing component that is not compatible with the above-described elastic averaging principles, or that would be further aided with the inclusion of a four-way elastic averaging system as herein disclosed, to an assembly that does facilitate elastic averaging and the benefits associated therewith.

Any suitable elastically deformable material may be used for the mating components and alignment features disclosed herein and discussed further below, particularly those materials that are elastically deformable when formed into the features described herein. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS). The material may be in any form and formed or manufactured by any suitable process, including stamped or formed metal, composite or other sheets, forgings, extruded parts, pressed parts, castings, or molded parts and the like, to include the deformable features described herein. The elastically deformable alignment features and associated component may be formed in any suitable manner. For example, the elastically deformable alignment features and the associated component may be integrally formed, or they may be formed entirely separately and subsequently attached together. When integrally formed, they may be formed as a single part from a plastic injection molding machine, for example. When formed separately, they may be formed from different materials to provide a predetermined elastic response characteristic, for example. The material, or materials, may be selected to provide a predetermined elastic response characteristic of any or all of the elastically deformable alignment features, the associated component, or the mating component. The predetermined elastic response characteristic may include, for example, a predetermined elastic modulus.

As used herein, the term vehicle is not limited to just an automobile, truck, van or sport utility vehicle, but includes any self-propelled or towed conveyance suitable for transporting a burden.

In accordance with an exemplary embodiment of the invention, and with reference to FIG. 1, an elastically averaging alignment system 10 includes a first component 100 having a first alignment member 102 and an elastically deformable alignment element 104 fixedly disposed with respect to the first alignment member 102, and a second component 200 having a second alignment member 202 and an alignment feature 204 fixedly disposed with respect to the second alignment member 202. The elastically deformable alignment element 104 is configured and disposed to interferingly, deformably and matingly engage the alignment feature 204, in a manner discussed in more detail below, to precisely align the first component 100 with the second component 200 in four directions, such as the +/−x-direction and the +/−y-direction of an orthogonal coordinate system, for example, which is herein referred to as four-way alignment. In an embodiment, the elastically deformable alignment element 104 is a lobular hollow tube (also herein referred to by reference numeral 104) with a cross-section having at least three outwardly oriented lobes 106.1, 106.2, 106.3 relative to a central axis 108 of the lobular hollow tube 104 (best seen with reference to FIG. 2), and the alignment feature 204 is a circular aperture (also herein referred to by reference numeral 204). In an embodiment, a chamfer 206 circumscribes the circular aperture 204 to facilitate insertion of the elastically deformable alignment element 104 into the circular aperture 204.

While reference is made herein and illustrations are depicted herein with the elastically deformable alignment element 104 having just three outwardly oriented lobes 106.1, 106.2, 106.3 in a tri-lobular hollow tube arrangement, it will be appreciated that the scope of the invention is not so limited and also encompasses other numbers of outwardly oriented lobes, such as four, five, or more lobes that are suitable for a purpose disclosed herein. However, for discussion purposes a tri-lobular arrangement will be used, without limitation, to describe in detail the principles of the invention disclosed herein.

For discussion purposes, the mating side of the first alignment member 102 visible in FIG. 1 is labeled 12, and the mating side of the second alignment member 202 visible in FIG. 1 is labeled 22. The non-visible sides of the first and second alignment members 102, 202 that are hidden from view in FIG. 1 are herein referred to by reference labels 11 and 21, respectively. For discussion purposes, the 12 and 22 sides are herein referred to as front views, and the 11 and 21 sides are herein referred to as rear views. Dashed lines 20 represent direction lines that may be traversed as the first and second components 100, 200 are assembled with respect to each other.

While not being limited to any particular structure, the first component 100 may be a decorative trim component of a vehicle with the customer-visible side being the 11 side, and the second component 200 may be a supporting substructure that is part of or attached to the vehicle and on which the first component 100 is fixedly mounted in precise alignment.

In an embodiment, the three outwardly oriented lobes 106.1, 106.2, 106.3 of the tri-lobular hollow tube 104 form three apex wall portions (also herein referred to by reference numerals 106.1, 106.2, 106.3) that are equally distributed about the central axis 108 of the tri-lobular hollow tube 104, with three connecting wall portions 106.4, 106.5, 106.6 integrally interconnected therebetween. In an embodiment, the three connecting wall portions 106.4, 106.5, 106.6 have flat planar outer surfaces. However, in another embodiment the three connecting wall portions 106.4, 106.5, 106.6 may be curved inward toward the central axis 108 of the tri-lobular hollow tube 104, may be curved outward away from the central axis 108 of the tri-lobular hollow tube 104, or may be a combination of inward curving and outward curving wall portions, which will be discussed further below.

Figure 2:
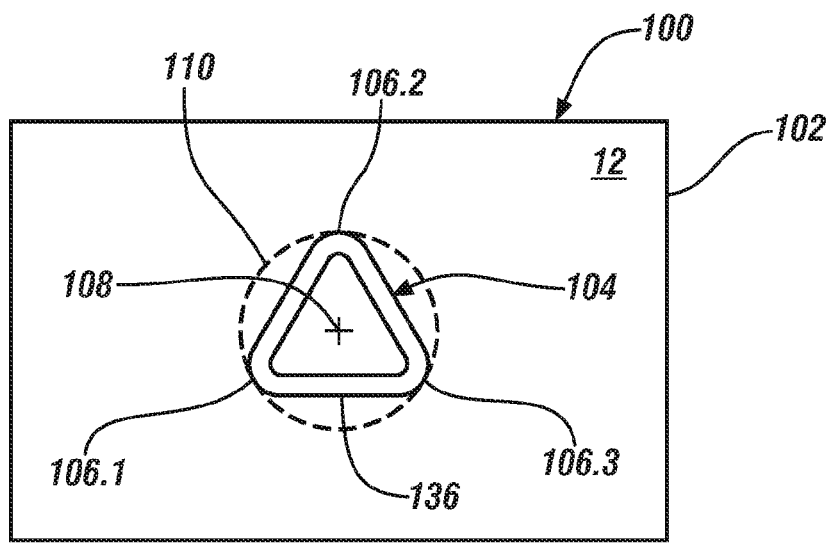
FIG. 2 depicts a front plan view of a first component of the elastically averaging alignment system of FIG. 1.
Figure 3:
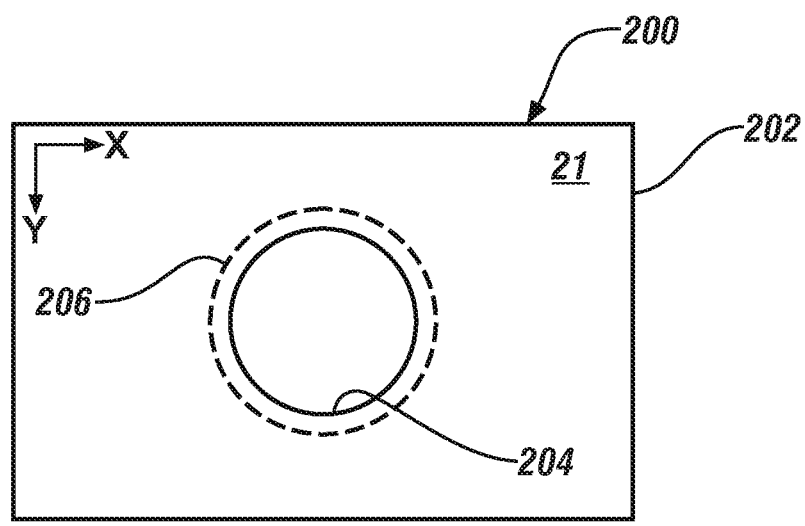
FIG. 3 depicts a rear plan view of a second component of the elastically averaging alignment system of FIG. 1.

Reference is now made to FIGS. 1, 2 and 3 in combination, where FIG. 2 depicts a front plan view of the first component 100 with the 12 side visible, and FIG. 3 depicts a rear plan view of the second component 200 with the 21 side visible. The dashed-line circle 110 depicted in FIG. 2 represents an imaginary smallest diameter aperture that the three outwardly oriented lobes 106.1, 106.2, 106.3 of the elastically deformable alignment element 104 could slidably fit into without interference and without any deformation of the elastically deformable alignment element 104. The dashed-line circle depicted in FIG. 3 is the chamfer 206 that is hidden from view from the 21 side, but is visible from the 22 side as depicted in FIG. 1. To provide an arrangement where the elastically deformable alignment element 104 is configured and disposed to interferingly, deformably and matingly engage the alignment feature 204, the diameter of the circular aperture (also herein referred to by reference numeral 204) is less than the diameter of the dashed-line circle 110, which necessarily creates a purposeful interference fit between the elastically deformable alignment element 104 and the alignment feature 204, and more particularly a purposeful interference fit between each lobe 106.1, 106.2, 106.3 and the circular aperture 204. As such, portions of the elastically deformable alignment element 104, such as the three outwardly oriented lobes 106.1, 106.2, 106.3, when inserted into the alignment feature 204 elastically deform to an elastically averaged final configuration that aligns the first alignment member 102 with the second alignment member 202 in four planar orthogonal directions (the +/−x-direction and the +/−y-direction). The aforementioned deformation of the elastically deformable alignment element 104 will now be discussed with reference to FIGS. 4-5.

Figure 4:
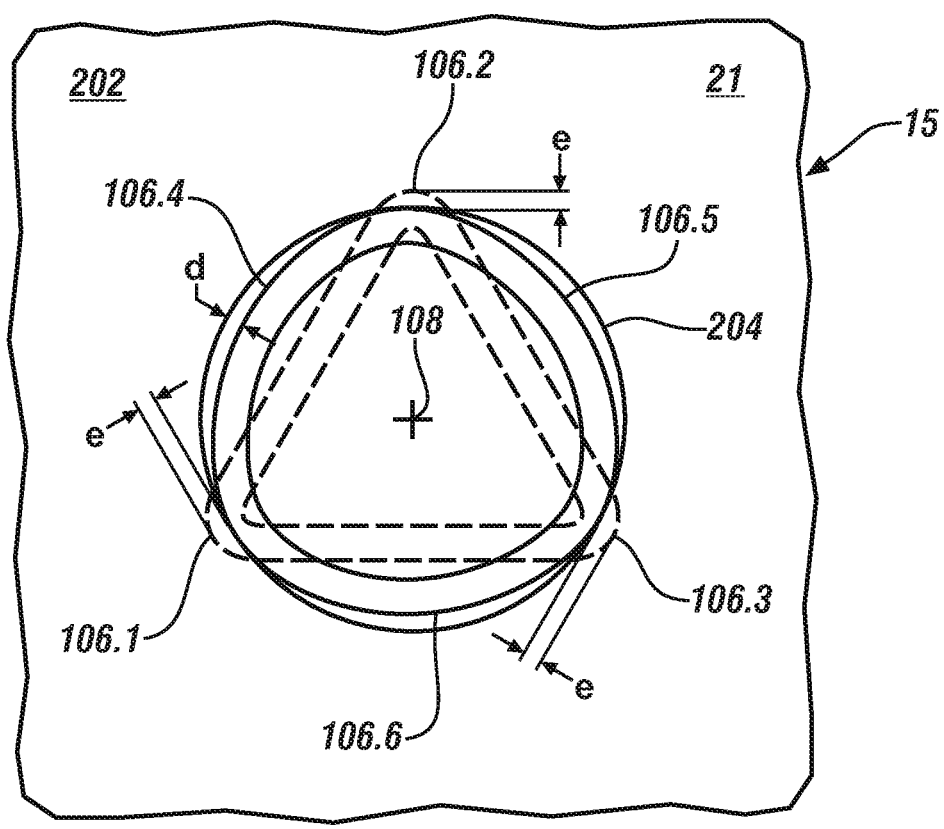
FIG. 4. depicts a partial rear plan view of first and second components of the elastically averaging alignment system of FIG. 1 in a mating arrangement, in accordance with an embodiment of the invention.
Figure 5:
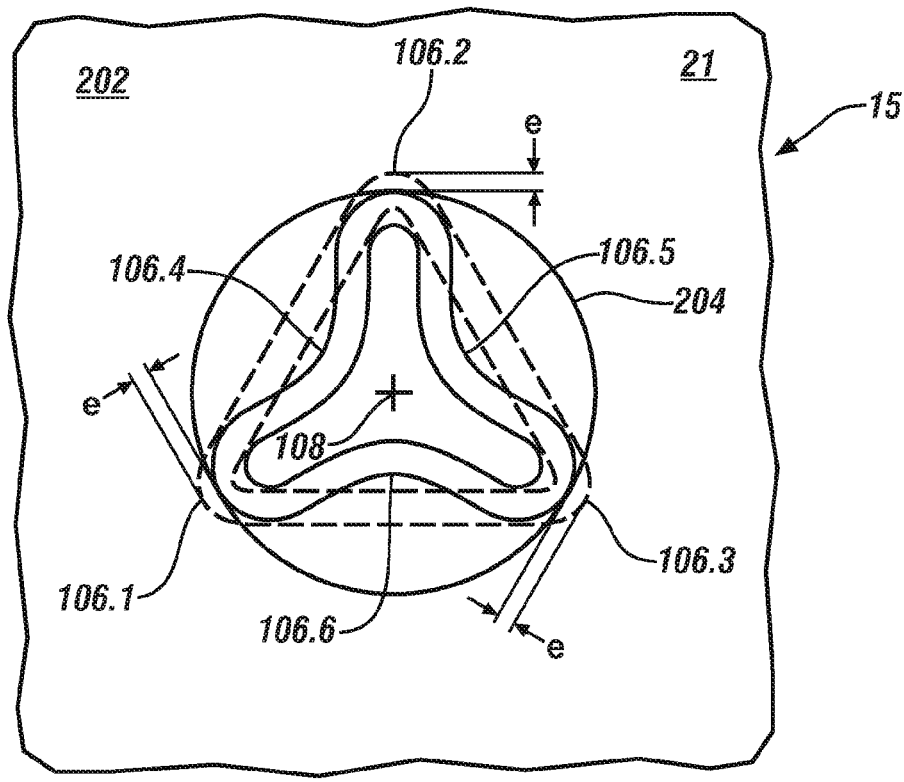
FIG. 5 depicts a partial rear plan view, alternative to that of FIG. 4, of first and second components of the elastically averaging alignment system of FIG. 1 in a mating arrangement, in accordance with an embodiment of the invention.

FIGS. 4 and 5 each depict a partial plan view of an assembly 15 of the first component 100 mated with the second component 200 where the elastically deformable alignment element 104 is interferingly, deformably and matingly engaged with the alignment feature 204, as viewed from the 21 side of the second alignment member 202 (hidden line portion of chamfer 206 omitted for clarity). In FIGS. 4 and 5, the dashed lines represent a pre-engagement shape of the tri-lobular hollow tube 104, and the correlating solid lines represent a post-engagement shape of the tri-lobular hollow tube 104. As previously described, outer surfaces of the three apex wall portions 106.1, 106.2, 106.3 are sized to create an interference fit with the circular aperture 204, and in accordance with an embodiment of the invention the connecting wall portions 106.4, 106.5, 106.6 are sized to fit within the circular aperture 204 with a clearance "d" therebetween (depicted in only one location, but understood to apply to all three similar locations), where "d" is equal to or greater than zero (d≥0). In the embodiment depicted in FIG. 4, the connecting wall portions 106.4, 106.5, 106.6 are configured to elastically deform away from the central axis 108 of the tri-lobular hollow tube 104. In the embodiment of FIG. 5, the connecting wall portions 106.4, 106.5, 106.6 are configured to elastically deform toward the central axis 108 of the tri-lobular hollow tube 104. As can be seen, the pre-engagement shape of the tri-lobular hollow tube 104 is depicted having an interference dimension "e" between each of the three apex wall portions 106.1, 106.2, 106.3 and the circular aperture 204, where "e" is greater than zero (e>0). While FIGS. 4 and 5 both depict the connecting wall portions 106.4, 106.5, 106.6 all deforming in a same direction (all outward in FIG. 4, and all inward in FIG. 5), it will be appreciated that the scope of the invention is not so limited and also encompasses an embodiment where the connecting wall portions 106.4, 106.5, 106.6 are configured to elastically deform in a combined arrangement that includes elastic deformation toward and away from the central axis 108 of the tri-lobular hollow tube 104.

In the embodiment depicted in FIG. 4 where the connecting wall portions 106.4, 106.5, 106.6 all deform outward during assembly of the first and second components 100, 200, it will be appreciated that an embodiment involves an arrangement where an outer perimeter 136 of a pre-engaged tri-lobular hollow tube 104 (best seen with reference to FIG. 2) must have a length that is less than a circumference of the circular aperture 204 in order to permit, albeit with elastically averaged deformation, insertion of the tri-lobular hollow tube 104 into the circular aperture 204 when the tri-lobular hollow tube 104 is interferingly, deformably and matingly engaged with the circular aperture 204 with outward deformation of the connecting wall portions 106.4, 106.5, 106.6. That is, when the connecting wall portions 106.4, 106.5, 106.6 of the tri-lobular hollow tube 104 are outwardly deformed by compression of the apex wall portions 106.1, 106.2, 106.3 such that the connecting wall portions and apex wall portions completely fill the opening of the circular aperture 204, the outer perimeter 136 of the now deformed tri-lobular tube 104 must be sized to fit within the opening of the circular aperture 204, and therefore the outer perimeter 136 of the tri-lobular hollow tube 104 must be smaller in length than the circumference of the circular aperture 204 in order to avoid a line-on-line interference condition of the engaging surfaces.

As previously described, and in a pre-engagement shape, the three connecting wall portions 106.4, 106.5, 106.6 of the tri-lobular hollow tube 104 may have a predefined shape that curves inward toward the central axis 108, or may have a predefined shape that curves outward away from the central axis 108. Such predefined pre-engagement shapes of the three connecting wall portions 106.4, 106.5, 106.6 of the elastically deformable alignment element 104 serves to facilitate bending either inward or outward of the three connecting wall portions 106.4, 106.5, 106.6 during assembly of the first and second components 100, 200 where the elastically deformable alignment element 104 is interferingly, deformably and matingly engaged with the alignment feature 204.

In an embodiment, and with reference back to FIG. 1, the tri-lobular hollow tube 104 includes a proximal end 112 proximate the first alignment member 102 and a distal end 114 distal to the first alignment member 102, and further includes a taper 140 (best seen with reference to FIG. 12) at the distal end, which may be created by a draft angle formed on the walls of a plastic injection molding machine configured to mold the first component 100 with integrally formed tri-lobular hollow tube 104, for example, or may be created by a chamfer formed on the distal end 114 of the tri-lobular hollow tube 104.

Figure 6:
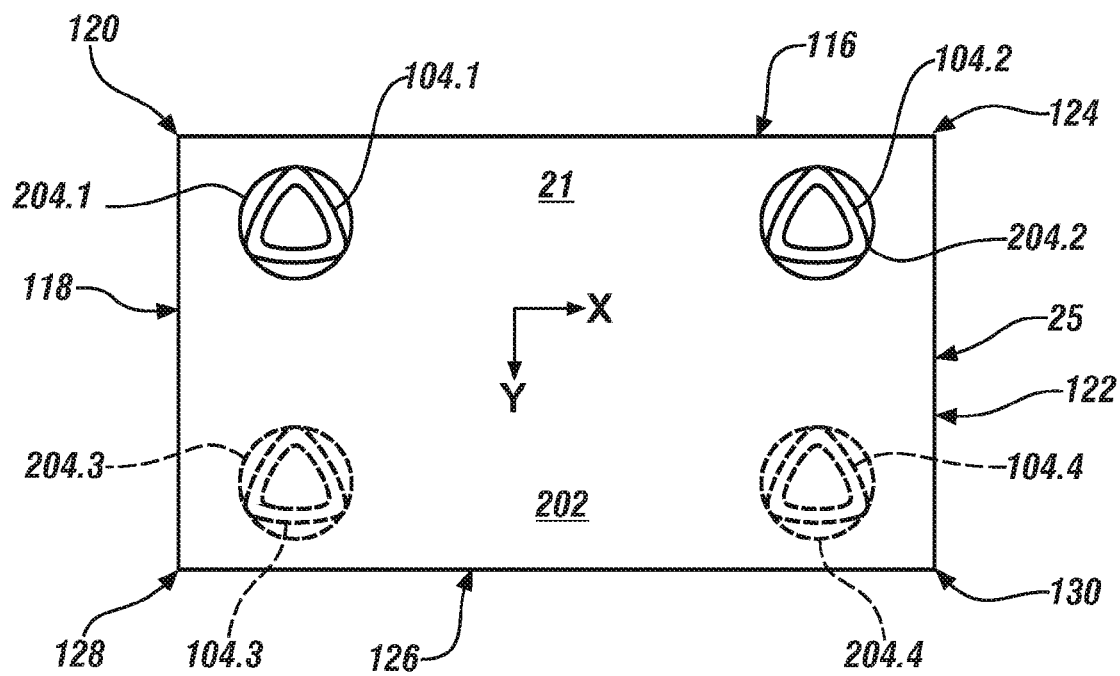
FIG. 6 depicts a rear plan view of an elastically averaging alignment system having additional elastically averaging features that are combinable with the elastically averaging features depicted in FIG. 1, in accordance with an embodiment of the invention.

While FIG. 1 depicts just a single elastically deformable alignment element 104 in a corresponding circular aperture 204 to provide four-way alignment of the first component 100 relative to the second component 200, it will be appreciated that the scope of the invention is not so limited and encompasses other quantities and types of elastically deformable alignment elements used in conjunction with the elastically deformable alignment element 104 and corresponding circular aperture 204, which will now be discussed with reference to FIGS. 6-8.

FIG. 6 depicts a plan view of an assembly 25 of the first component 100 mated with the second component 200 as viewed from the 21 side of the second alignment member 202 (hidden line portion of chamfer 206 omitted for clarity) similar to that of FIGS. 1 and 4, but with first and second spaced-apart elastically deformable alignment elements (tri-lobular hollow tubes) 104.1, 104.2 interferingly, deformably and matingly engaged with corresponding spaced-apart alignment features (circular apertures) 204.1, 204.2 being depicted in solid lines, and optional third and fourth spaced-apart elastically deformable alignment elements (tri-lobular hollow tubes) 104.3, 104.4 interferingly, deformably and matingly engaged with corresponding spaced-apart alignment features (circular apertures) 204.3, 204.4 being depicted in dashed lines.

In the embodiment of FIG. 6, the top edge 116 and left edge 118 at the top-left corner 120 of the first component 100 (best seen with reference also to FIG. 1 as the features of the first component 100 are hidden behind the second component 200 in FIG. 6) are controlled relative to the second component 200 by the four-way locating function of the first alignment element and feature 104.1, 204.1, and the top edge 116 and right edge 122 at the top-right corner 124 of the first component 100 (again best seen with reference also to FIG. 1) are controlled relative to the second component 200 by the four-way locating function of the second alignment element and feature 104.2, 204.2. The optional third and fourth alignment elements and features 104.3, 204.3 and 104.4, 204.4, if and when used, provide similar four-way locating means for the bottom edge 126 and left edge 118 at the bottom-left corner 128, and the bottom edge 126 and right edge 122 at the bottom-right corner 130, respectively, of the first component 100 relative to the second component 200. From the foregoing it will be appreciated that each of the first, second, third and fourth elastically deformable alignment elements 104.1, 104.2, 104.3, 104.4, when employed and when inserted into respective ones of the first, second, third and fourth alignment features 204.1, 204.2, 204.3, 204.4, elastically deform in a manner previously described herein to an elastically averaged final configuration that further aligns the first alignment member 102 with the second alignment member 202 in four planar orthogonal directions (+/−x-direction and +/−y-direction).

As a brief aside and in view of the foregoing discussion, it will be appreciated that an outer edge, such as the top edge 116 for example, of the first alignment member 102 of the first component 100 may be outboard of, inboard of, or in alignment with the corresponding edge of the second alignment member 202 of the second component 200, depending on the application that could advantageously benefit from use of the elastically averaging alignment system 10 disclosed herein. In the embodiment of FIG. 6, the outer edges (116, 118, 122, 126) of the first alignment member 102 are depicted in alignment with the corresponding edges of the second alignment member 202, but it will be understood that such an arrangement is not a limitation to the scope of the invention disclosed herein.

Reference is now made to FIG. 7, which depicts a plan view of an assembly 30 of the first component 100 mated with the second component 200 as viewed from the 21 side of the second alignment member 202 (hidden line portion of chamfer 206 omitted for clarity) similar to that of FIGS. 1 and 4, but with the first alignment element (tri-lobular hollow tube) 104 and first alignment feature (circular aperture) 204 accompanied by a spaced-apart second elastically deformable alignment element 304 in the form of a circular hollow tube that is interferingly, deformably and matingly engaged with a corresponding spaced-apart second alignment feature 404 in the form of a slotted aperture, similar to the elastic tube alignment system described in co-pending U.S. patent application Ser. No. 13/187,675 and particularly illustrated in FIG. 13 of the same, which is herein incorporated by reference in its entirety. As depicted in FIG. 7, the slotted aperture 404 has its major axis 408 oriented orthogonal to the central axis 108 of the tri-lobular hollow tube 104, which in conjunction with the four-way alignment function provided by the first alignment element and feature 104, 204, further provides a two-way alignment function in a direction perpendicular to the major axis 408.

While the major axis 408 of the slotted aperture 404 is depicted in FIG. 7 to be oriented directly towards the central axis 108 of the tri-lobular hollow tube 104, it will be appreciated that such an orientation may not be necessary or practical in some situations, and that an embodiment includes an arrangement where the major axis 408 of the slotted aperture 404 is oriented more toward than away from the central axis 108 of the tri-lobular hollow tube 104 without departing from a scope of the invention disclosed herein.

In the embodiment of FIG. 7, the second alignment element and feature 304, 404 serve to angularly orient, in the x-y plane and with respect to the central axis 108 of the tri-lobular hollow tube 104, the first alignment member 102 of the first component 100 relative to the second alignment member 202 of the second component 200, by configuring and disposing the second elastically deformable alignment element (circular hollow tube) 304 to interferingly, deformably and matingly engage with the second alignment feature (slotted aperture) 404 in a compressive mode but not in a bending mode.

Reference is now made to FIG. 8, which depicts a plan view of an assembly 35 of the first component 100 mated with the second component 200 as viewed from the 21 side of the second alignment member 202 (hidden line portion of chamfer 206 omitted for clarity) similar to that of FIGS. 1, 4 and 7, but with the first alignment element (tri-lobular hollow tube) 104 and first alignment feature (circular aperture) 204 accompanied by spaced-apart second and third elastically deformable alignment elements 504, 604 each in the form of a circular hollow tube that is interferingly, deformably and matingly engaged with corresponding and respective spaced-apart second and third alignment features 704, 804 each in the form of a slotted aperture, similar to the elastic tube alignment system described in co-pending U.S. patent application Ser. No. 13/187,675 and particularly illustrated in FIG. 13 of the same. As depicted in FIG. 8, each slotted aperture 704, 804 has its major axis 708, 808 oriented in a plane orthogonal to the central axis 108, but not oriented orthogonal to the central axis 108, of the tri-lobular hollow tube 104, which in conjunction with the four-way alignment function provided by the first alignment element and feature 104, 204, further provides a two-way alignment function in a direction perpendicular to the major axes 708, 808 and perpendicular to the lower edge 126 of the first component 100 (see also FIG. 1 for depiction of lower edge 126).

While the major axes 708, 808 of respective slotted apertures 704, 804 are depicted oriented parallel to a lower edge 126 of the first component 100, it will be appreciated that such an orientation may not be necessary or practical in some situations, and that an embodiment includes an arrangement where each major axis 708, 808 of the slotted apertures 704, 804 are oriented more parallel with than perpendicular to the lower edge 126 (in more general terms, the lower edge 126 may be considered an outer edge that is associated with the respective second and third alignment elements and features), which from an alternative perspective provides an arrangement where each major axis 708, 808 of the respective slotted apertures 704, 804 is oriented more away from than toward the central axis 108 of the tri-lobular hollow tube 104, without departing from a scope of the invention disclosed herein.

In the embodiment of FIG. 8, and consistent with the elastic tube alignment system described in co-pending U.S. patent application Ser. No. 13/187,675, the second and third elastically deformable alignment elements (circular hollow tubes) 504, 604 may be centrally disposed closer to the central axis 108 of the tri-lobular hollow tube 104 than the major axes 708, 808 of the slotted apertures 704, 804 are disposed relative to the center of the circular aperture 204, thereby resulting in an interference fit and a slight bending of the circular hollow tubes 504, 604 as they are interferingly, deformably and matingly engaged with respective ones of the slotted apertures 704, 804. As such, the embodiment of FIG. 8 serves to accurately locate the lower edge 126 of the first alignment member 102 with the respective lower edge (also herein referred to by reference numeral 126) of the second alignment member 202 by configuring and disposing the second and third elastically deformable alignment elements (circular hollow tubes) 504, 604 to interferingly, deformably and matingly engage with the respective second alignment features (slotted apertures) 704, 804 in a compressive mode and in a bending mode. To assist with the engagement of the circular hollow tubes 504, 604 with the slotted apertures 704, 804 in the manner herein described, the 22 side of the second alignment member 202 may be provided with a chamfer disposed around the perimeter of each slotted aperture 704, 804, which is not specifically illustrated herein but is consistent with the elastic tube alignment system described in co-pending U.S. patent application Ser. No. 13/187,675.

Reference is now made to FIGS. 9 and 10, which depict distal end plan views of alternative tri-lobular hollow tubes 104', 104'' consistent with an embodiment of the invention disclosed herein. Both versions of the tri-lobular hollow tubes 104', 104'' have connecting wall portions 106.4, 106.5, 106.6 that are thinner in the middle section than at the end sections, as indicated by references "t" and "T", where t<T, or more generally where t≠T. In the embodiment of FIG. 9, the outer surfaces of the connecting wall portions 106.4, 106.5, 106.6 are convex with respect to the central axis 108 of the tri-lobular hollow tube 104', which is contemplated to facilitate elastic deformation of the tri-lobular hollow tube 104' in the manner depicted in FIG. 5. In the embodiment of FIG. 10, the inner surfaces of the connecting wall portions 106.4, 106.5, 106.6 are concave with respect to the central axis 108 of the tri-lobular hollow tube 104'', which is contemplated to facilitate elastic deformation of the tri-lobular hollow tube 104'' in the manner depicted in FIG. 4. By controlling the direction of elastic deformation of the connecting wall portions 106.4, 106.5, 106.6 (inward or outward for example), it is contemplated that the overall elastic averaging achieved by the elastically averaging alignment system 10 will be more predictable as compared to a system having elastic deformation in random directions.

Figure 11:
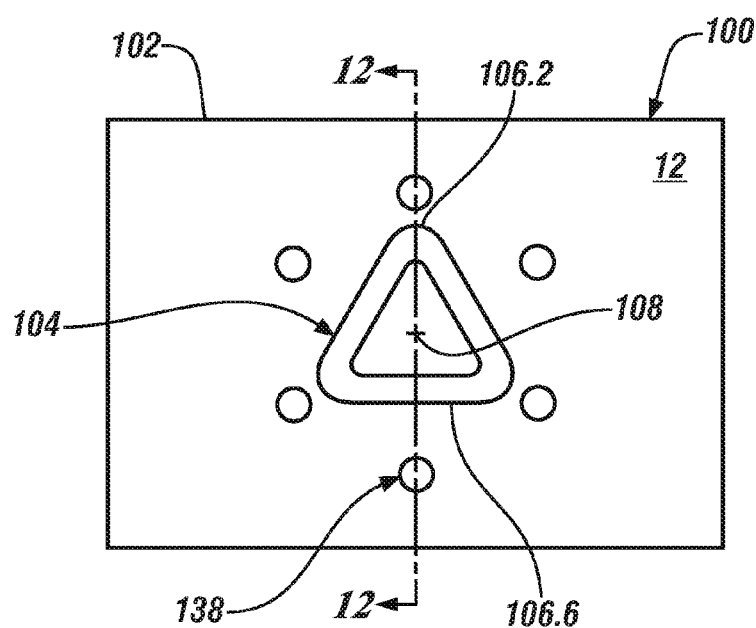
FIG. 11 depicts an alternative front plan view of the first component similar to that of FIG. 1, but with integrally formed standoffs, in accordance with an embodiment of the invention.
Figure 12:
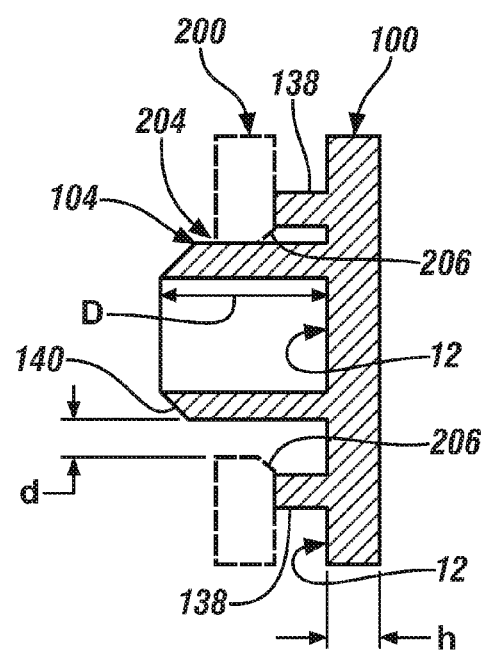
FIG. 12 depicts a section cut through FIG. 11 along cut line 12-12, in accordance with an embodiment of the invention.

Reference is now made to FIGS. 11 and 12, where FIG. 11 depicts an alternative front plan view (12 side) of the first component 100 similar to that of FIG. 1, but with standoffs 138 (six illustrated but only one enumerated) integrally formed with the first alignment member 102 and distributed around the central axis 108 of the lobular hollow tube 104, and where FIG. 12 depicts a section cut 12-12 through FIG. 11 with the second component 200 depicted in dashed line fashion. The standoffs 138 are spaced relative to the outer diameter of the chamfer 206 (also seen with reference to FIG. 3) of the second alignment member 202 such that they provide a support platform at a height "h" above the 12 side of the first component 100 upon which the 22 side of the second component 200 rests when the elastically deformable alignment element 104 is configured and disposed to interferingly, deformably and matingly engage the alignment feature 204 (best seen with reference to FIG. 12). Stated alternatively, the standoffs 138 are disposed and configured to provide a point of engagement between the alignment feature 204 and the elastically deformable alignment element 104 at an elevation "h" above the base, surface 12, of the elastically deformable alignment element 104.

While FIG. 11 depicts six standoffs 138 in the form of circular posts at a height "h" relative to the 12 side of the first component 100, it will be appreciated that the scope of the invention is not so limited and also encompasses other numbers and shapes of standoffs suitable for a purpose disclosed herein, and also encompasses a standoff in the form of a continuous ring disposed around the lobular hollow tube 104. All such alternative standoff arrangements are contemplated and considered within the scope of the invention disclosed herein.

While FIG. 11 depicts standoffs 138 integrally formed on the 12 side of the first component 100, it will be appreciated that a similar function may be achieved by integrally forming the standoffs on the 22 side of the second component 200, which is herein contemplated and considered to be within the scope of the invention disclosed herein.

In an embodiment, and as depicted in FIG. 12, the depth "D" of the lobular hollow tube 104 has a bottom surface that is in-line with the 12 side of the first component 100. By providing standoffs 138 that elevate a point of engagement between the alignment feature 204 and the elastically deformable alignment element 104 relative to the 12 side of the first component 100, a degree of elastic deformation of the elastically deformable alignment element 104 suitable for a purpose disclosed herein can be achieved. If the standoffs 138 were omitted and the 22 side of the second component 200 was permitted to rest on the 12 side of the first component 100 where the apex and connecting wall portions of the lobular hollow tube 104 meet with the base material of the first alignment member 102, the rigidity of such wall portions at the base of the lobular hollow tube 104 would be too stiff in bending to provide a degree of elastic deformation suitable for a purpose disclosed herein. As such, a standoff arrangement as herein disclosed, or an arrangement having the functional equivalent, is advantageous for providing a degree of elastic deformation of the elastically deformable alignment element 104 suitable for a purpose disclosed herein.

As can be seen in FIG. 12, the apex wall portion 106.2 of the lobular hollow tube 104 engages with the circular aperture 204, while in an embodiment the connecting wall portion 106.6 has a gap "d" with respect to the circular aperture 204, which is consistent with the embodiment depicted in FIG. 4.

Figure 13:
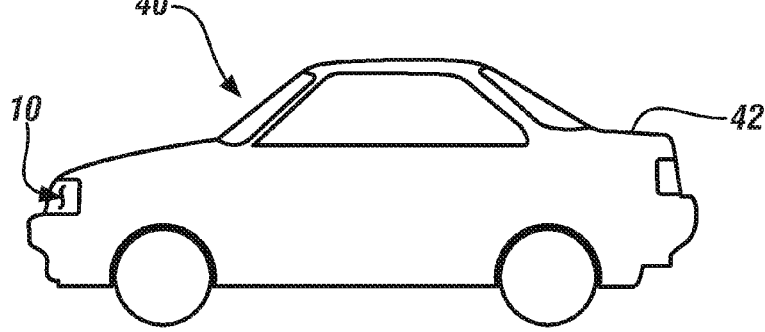
FIG. 13 depicts a vehicle having the elastically averaging alignment system of FIG. 1, in accordance with an embodiment of the invention.

In view of all of the foregoing, and with reference now to FIG. 13, it will be appreciated that an embodiment of the invention also includes a vehicle 40 having a body 42 with an elastically averaging alignment system 10 as herein disclosed integrally arranged with the body 42. In the embodiment of FIG. 13, the elastically averaging alignment system 10 is depicted forming at least a portion of a front grill of the vehicle 40. However, it is contemplated that an elastically averaging alignment system 10 as herein disclosed may be utilized with other features of the vehicle 40, such as interior trim for example.

In view of the foregoing, it will be appreciated that some embodiments of the elastically averaging alignment system disclosed herein may include one or more of the following advantages: an elastically deformable alignment system utilizing a single elastically deformable alignment element that provides four-way alignment with only three regions of interference when engaged with a corresponding single alignment feature having the form of a circular aperture; an elastically deformable alignment system that provides four-way alignment via a four-way elastically deformable alignment system, and two-way alignment absent a bending mode when combined with a two-way elastically deformable alignment system having a slotted aperture with a major axis oriented more toward than away from the four-way elastically deformable alignment system; an elastically deformable alignment system that provides four-way alignment via a four-way elastically deformable alignment system, and two-way alignment with a bending mode when combined with a two-way elastically deformable alignment system having a slotted aperture with a major axis oriented more away from than toward the four-way elastically deformable alignment system; and, an elastically deformable alignment system utilizing a lobular hollow tube alignment element with a variable wall thickness that provides a predictable direction of elastic deformation of the lobular hollow tube walls for predictable elastic averaging deformation.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastically averaged alignment system, comprising:
   a first component comprising a first alignment member and an elastically deformable alignment element fixedly disposed with respect to the first alignment member;
   a second component comprising a second alignment member and an alignment feature fixedly disposed with respect to the second alignment member;
   wherein the elastically deformable alignment element is configured and disposed to interferingly, deformably and matingly engage the alignment feature;
   wherein the elastically deformable alignment element comprises a lobular hollow tube having a cross-section comprising at least three outwardly oriented lobes relative to a central axis of the hollow tube, and the alignment feature comprises a circular aperture; and
   wherein portions of the elastically deformable alignment element when inserted into the alignment feature elastically deform to an elastically averaged final configuration that aligns the first alignment member with the second alignment member in four planar orthogonal directions;
   wherein the lobular hollow tube comprises a tube wall having three apex wall portions equally distributed about a central axis of the lobular hollow tube and three connection wall portions interconnected between the apex wall portions, wherein the apex wall portions are sized to create an interference fit with the circular aperture, wherein the connecting wall portion are sized to fit within the circular aperture with clearance therebetween, and wherein the connecting wall portions are configured to elastically deform toward the central axis of the lobular hollow tube, away from the central axis of the lobular hollow tube, or in combination that includes elastic deformation toward and away from the central axis of the lobular hollow tube.

2. The elastically averaged alignment system of claim 1, wherein the lobular hollow tube comprises a tri-lobular hollow tube.

3. The elastically averaged alignment system of claim 1, wherein the diameter of the circular aperture is sized to create an interference fit with each lobe of the lobular hollow tube.

4. The elastically averaged alignment system of claim 1, wherein the three connecting wall portions are curved inward toward the central axis of the lobular hollow tube.

5. The elastically averaged alignment system of claim 1, wherein the three connecting wall portions are curved outward away from the central axis of the lobular hollow tube.

6. The elastically averaged alignment system of claim 1, wherein an outer perimeter of the lobular hollow tube has a length that is less than a circumference of the circular aperture.

7. The elastically averaged alignment system of claim 1, wherein the elastically deformable alignment element is integrally formed with the first alignment member to form a single part.

8. The elastically averaged alignment system of claim 1, wherein the alignment feature is integrally formed with the second alignment member to form a single part.

9. The elastically averaged alignment system of claim 1, wherein the first component and the second component each have respective engagement sides relative to each other, and further wherein:
the second alignment member comprises a chamfer on its respective engagement side that circumscribes the circular aperture.

10. The elastically averaged alignment system of claim 1, wherein the first component and the second component each have respective engagement sides relative to each other, and further wherein:
the lobular hollow tube of the elastically deformable alignment element comprises a proximal end proximate the first alignment member and a distal end distal to the first alignment member; and
the distal end comprises a taper on its respective engagement side.

11. The elastically averaged alignment system of claim 1, wherein the elastically deformable alignment element is a first of a plurality of the elastically deformable alignment element, wherein the alignment feature is a first of a plurality of the alignment feature, and further comprising:
a second of the plurality of the elastically deformable alignment element fixedly disposed with respect to the first alignment member and spaced apart from the first of the plurality of elastically deformable alignment element;
a second of the plurality of the alignment feature fixedly disposed with respect to the second alignment member and spaced apart from the first of the plurality of the alignment feature;
wherein the second of the plurality of the elastically deformable alignment element is configured and disposed to interferingly, deformably and matingly engage the second of the plurality of the alignment feature; and
wherein portions of each of the first and second of the plurality of the elastically deformable alignment elements when inserted into respective ones of the first and second of the plurality of the alignment features elastically deform to an elastically averaged final configuration that further aligns the first alignment member with the second alignment member in four planar orthogonal directions.

12. The elastically averaged alignment system of claim 1, wherein the elastically deformable alignment element is a first elastically deformable alignment element and the alignment feature is a first alignment feature, and further wherein:
the first alignment member further comprises a second elastically deformable alignment element comprising a hollow tube having a circular cross-section relative to a central axis thereof, the second elastically deformable alignment element being space apart from the first elastically deformable alignment element;
the second alignment member further comprises a second alignment feature comprising a slotted aperture spaced apart from the first alignment feature, the slotted aperture having a major axis oriented orthogonal to a central axis of the first alignment feature; and
wherein the second elastically deformable alignment element is configured and disposed to interferingly, deformably and matingly engage the second alignment feature in a compressive mode and not in a bending mode.

13. The elastically averaged alignment system of claim 1, wherein the elastically deformable alignment element is a first elastically deformable alignment element and the alignment feature is a first alignment feature, and further wherein:
the first alignment member further comprises a second elastically deformable alignment element comprising a hollow tube having a circular cross-section relative to a central axis thereof, the second elastically deformable alignment element being spaced apart from the first elastically deformable alignment element;
the second alignment member further comprises a second alignment feature comprising a slotted aperture spaced apart from the first alignment feature, the slotted aperture having a major axis oriented in a plane orthogonal to a central axis of the first alignment feature; and
wherein the second elastically deformable alignment element is configured and disposed to interferingly, deformably and matingly engage the second alignment feature in a compressive and in a bending mode.

14. The elastically averaged alignment system of claim 1, wherein:
at least one of the first component and the second component comprises a standoff disposed proximate the elastically deformable alignment element, and disposed and configured to provide a point of engagement between the alignment feature and the elastically deformable alignment element at an elevation "h" above the base of the elastically deformable alignment element.

15. A vehicle, comprising:
a body; and
an elastically averaged alignment system integrally arranged with the body, the elastically averaged alignment system comprising:
a first component comprising a first alignment member and an elastically deformable alignment element fixedly disposed with respect to the first alignment member;
a second component comprising a second alignment member and an alignment feature fixedly disposed with respect to the second alignment member;
wherein the elastically deformable alignment element is configured and disposed to interferingly, deformably and matingly engage the alignment feature;
wherein the elastically deformable alignment element comprises a lobular hollow tube having a cross-section comprising at least three outwardly oriented lobes relative to a central axis of the hollow tube, and the alignment feature comprises a circular aperture; and
wherein portions of the elastically deformable alignment element when inserted into the alignment feature elastically deform to an elastically averaged final configuration that aligns the first alignment member with the second alignment member in four planar orthogonal directions;

wherein the lobular hollow tube comprises a tube wall having three apex wall portions equally distributed about a central axis of the lobular hollow tube and three connection wall portions interconnected between the apex wall portions, wherein the apex wall portions are sized to create an interference fit with the circular aperture, wherein the connecting wall portions are sized to fit within the circular aperture with clearance therebetween, and wherein the connecting wall portions are configured to elastically deform toward the central axis of the lobular hollow tube, away from the central axis of the lobular hollow tube, or in a combination that includes elastic deformation toward and away from the central axis of the lobular hollow tube.

* * * * *